US 9,360,642 B2

(12) United States Patent
Morioka et al.

(10) Patent No.: US 9,360,642 B2
(45) Date of Patent: Jun. 7, 2016

(54) OPTICAL RECEPTACLE AND OPTICAL MODULE PROVIDED WITH SAME

(71) Applicant: ENPLAS CORPORATION, Kawaguchi-shi, Saitama (JP)

(72) Inventors: Shimpei Morioka, Kawaguchi (JP); Tadanobu Niimi, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/386,734

(22) PCT Filed: Feb. 20, 2013

(86) PCT No.: PCT/JP2013/054104
§ 371 (c)(1),
(2) Date: Sep. 19, 2014

(87) PCT Pub. No.: WO2013/140922
PCT Pub. Date: Sep. 26, 2013

(65) Prior Publication Data
US 2015/0086165 A1    Mar. 26, 2015

(30) Foreign Application Priority Data

Mar. 23, 2012   (JP) ................................. 2012-067041

(51) Int. Cl.
*G02B 6/42*   (2006.01)
*G02B 6/43*   (2006.01)

(52) U.S. Cl.
CPC ............ *G02B 6/4286* (2013.01); *G02B 6/4214* (2013.01); *G02B 6/43* (2013.01)

(58) Field of Classification Search
CPC ............................. G02B 6/4214; G02B 6/4286
USPC ................................................. 385/49, 88–94
See application file for complete search history.

(56) References Cited

U.S. PATENT DOCUMENTS 5,997,185 A      12/1999  Kropp
6,694,074 B2 *   2/2004   Schunk ........................... 385/33
(Continued)

FOREIGN PATENT DOCUMENTS

JP   H01-260882 A    10/1989
JP   H04-116881 A    4/1992
(Continued)

OTHER PUBLICATIONS

International Search Report (ISR) mailed Apr. 2, 2013, issued for International application No. PCT/JP2013/054104.

*Primary Examiner* — Daniel Petkovsek
(74) *Attorney, Agent, or Firm* — Law Office of Katsuhiro Arai

(57) ABSTRACT

In an embodiment, an optical receptacle includes a first lens face that is disposed on a first surface 2a on a photoelectric conversion device 3 side in an optical receptacle main body so that a portion of light of the light of a light-emitting element 7 is incident thereon, a first reflective surface 14 that is disposed on a second surface 2b on the side opposite to the first surface 2a and reflects the light that has been incident on the first lens face 11, and a second reflective surface 16 that is disposed on the first surface 2a continuously with the first lens face 11 so that a remaining portion of light of the light of the light-emitting element 7 is incident thereon and reflects the incident remaining portion of light towards a light-receiving element 8 as monitor light are included.

6 Claims, 4 Drawing Sheets

(56) References Cited

U.S. PATENT DOCUMENTS

| | | | |
|---|---|---|---|
| 6,959,133 B2* | 10/2005 | Vancoill et al. | 385/47 |
| 6,963,683 B2* | 11/2005 | Capewell | 385/36 |
| 7,099,536 B1 | 8/2006 | Chandra | |
| 8,000,358 B2* | 8/2011 | Wang | 372/29.011 |
| 8,787,714 B2* | 7/2014 | Morioka | 385/33 |
| 2001/0004413 A1 | 6/2001 | Aihara | |
| 2008/0142815 A1 | 6/2008 | Morioka | |
| 2011/0057204 A1 | 3/2011 | Morioka | |

FOREIGN PATENT DOCUMENTS

| | | |
|---|---|---|
| JP | 2000-502819 A | 3/2000 |
| JP | 2001-174671 A | 6/2001 |
| JP | 2003-060299 A | 2/2003 |
| JP | 2007-171427 A | 7/2007 |
| JP | 2007-334166 A | 12/2007 |
| JP | 2008-151894 A | 7/2008 |
| JP | 2011-039151 A | 2/2011 |

* cited by examiner

OPTICAL RECEPTACLE AND OPTICAL MODULE PROVIDED WITH SAME

This application is the U.S. National Phase under 35 U.S.C. §371 of International Application PCT/JP2013/054104, filed Feb. 20, 2013, which claims priorities to Japanese Patent Application No. 2012-067041, filed Mar. 23, 2012. The International Application was published under PCT Article 21(2) in a language other than English.

TECHNICAL FIELD

The present invention relates to an optical receptacle and an optical module including the optical receptacle. In particular, the present invention relates to an optical receptacle suitable for optically coupling a light-emitting element and an optical transmission body, and an optical module including the optical receptacle.

BACKGROUND ART

Since the past, an optical module has been used in optical communication using optical fibers, the optical module including a light-emitting element such as a surface light-emitting laser. For example, a vertical cavity surface emitting laser (VCSEL).

In this type of optical module, an optical module component referred to as an optical receptacle is used. The optical receptacle is used in optical transmission via optical fiber by light that includes communication information and has been emitted from the light-emitting element being coupled with an end face of the optical fiber.

In addition, since the past, various proposals have been made regarding the optical module to monitor the light (intensity and amount of light) emitted from the light-emitting element, for the purpose of stabilizing output characteristics of the light-emitting element against temperature changes and adjusting optical output.

For example, Patent Literature 1 proposes a technology in which Fresnel reflection by a reflective/transmissive surface composed of the inner surface of a first recessing section formed in a lens array is used to reflect a portion of the emitted light from the light-emitting element towards a light-receiving element side as monitor light.

PRIOR ART LITERATURES

Patent Literatures

Patent Literature 1: Japanese Patent Laid-open Publication No. 2011-039151

DISCLOSURE OF INVENTION

Problem to be Solved by the Invention

In the above-described technology described in Patent Literature 1, there is an advantage in that the number of components required for acquiring the monitor light can be reduced by use of Fresnel reflection. However, formation of the first recessing section to divide the emitted light of the light-emitting element into the monitor light and coupling light to be coupled with the optical fiber, and formation of a second recessing section to direct the advancing direction of the monitor light towards the light-receiving element side are essential. Therefore, further simplification of the configuration and further improvement in mechanical strength are limited.

In addition, in the technology described in Patent Literature 1, the monitor light that has been reflected by the reflective/transmissive surface is subjected to direction change twice, through refraction and reflection at the second recessing section. Therefore, a design in which the position of the light-receiving element for receiving the monitor light is freely selected is difficult.

The present invention has been achieved in light of the above-described issues. An object of the present invention is to provide an optical receptacle capable of achieving a simpler configuration, improved mechanical strength, and improved freedom of design, in addition to appropriately actualizing optical communication accompanying monitoring, and an optical module including the optical receptacle.

Means for Solving Problem

To achieve the above-described object, an optical receptacle according to a first aspect of the present invention is an optical receptacle that is capable of optically coupling a light-emitting element and an optical transmission body in a state in which the optical receptacle is disposed between a photoelectric conversion device and the optical transmission body, the photoelectric conversion device in which the light-emitting element and a light-receiving element that receives monitor light for monitoring light emitted from the light-emitting element are disposed on a substrate. The optical receptacle includes: a first lens face that is disposed on a first surface on the photoelectric conversion device side in an optical receptacle main body so that a portion of light of the light from the light-emitting element is incident thereon; a first reflective surface that is disposed on a second surface on the side opposite to the first surface in the optical receptacle main body with a predetermined first slope angle in relation to the first surface so that the portion of light that has been incident on the first lens arrives, and that reflects the arrived portion of light; an emission surface that emits the portion of light that has been reflected by the first reflective surface towards the optical transmission body; and a second reflective surface that is disposed on the first surface continuously with the first lens face so that a remaining portion of light other than the portion of light, of the light of the light-emitting element, is incident thereon, and that reflects the incident remaining portion of light towards the light-receiving element as the monitor light.

In the invention according to the first aspect, the remaining portion of light of the light of the light-emitting element can be reflected towards the light-receiving element as the monitor light by the second reflective surface that is continuous with the first lens face. Therefore, a recessing section for light division can be made unnecessary. Optical transmission accompanying monitoring can be actualized by a simple and sturdy configuration. In addition, the monitor light is incident on the light-receiving element without a change in direction on the optical path subsequent to the second reflective surface. Therefore, an optical path for the monitor light that is suitable for free positioning of disposition position of the light-receiving element can be easily designed simply by the surface shape of the second reflective surface being selected.

In addition, an optical receptacle according to a second aspect of the present invention is the optical receptacle according to claim 1 in which, further, the second reflective surface is formed by only the surface shape of a section adjacent to the first lens face in the optical receptacle main body, and generates the monitor light by Fresnel-reflecting the remaining portion of light.

In the invention according to the second aspect, the second reflective surface can be actualized by only the surface shapes of the optical receptacle main body. Therefore, the number of components can be reduced.

Furthermore, an optical receptacle according to a third aspect of the present invention is the optical receptacle according to the first or second aspect in which, further, the second reflective surface has a sloped plane that forms a predetermined second slope angle in relation to the first surface.

In the invention according to the third aspect, the surface shape of the second reflective surface can be simplified.

Still further, an optical receptacle according to a forth aspect of the present invention is the optical receptacle according to the first or second aspect in which, further, the second reflective surface has a convex curved surface that faces the light-receiving element side.

In the invention according to the forth aspect, the second reflective surface can be provided with a light-collecting function for the monitor light. Therefore, coupling of the monitor light with the light-receiving element can be efficiently performed.

In addition, an optical receptacle according to a fifth aspect of the present invention is the optical receptacle according to any one of the first to forth aspects in which, further, the emission surface is a second lens face that emits the portion of light while converging the portion of light.

In the invention according to the fifth aspect, coupling of the light of the light-emitting element with the optical transmission body can be efficiently performed.

Furthermore, an optical receptacle according to a sixth aspect of the present invention is the optical receptacle according to any one of the first to fifth aspects in which, further, the first reflective surface is a total reflection surface on which the portion of light is internally incident at an angle of incidence that is greater than a critical angle and that totally reflects the internally incident portion of light.

In the invention according to the sixth aspect, the first reflective surface can be actualized by only the surface shapes of the optical receptacle main body. Therefore, the number of components can be reduced.

Still further, an optical module according to a seventh aspect of the present invention includes: the optical receptacle according to any one of the first to sixth aspects; and the photoelectric conversion device according to the first aspect.

In the invention according to the seventh aspect, optical transmission accompanying monitoring can be actualized by a simple and sturdy configuration. In addition, the disposition position of the light-receiving element and the optical of the monitor light suitable for the disposition position can be freely designed. Furthermore, through use of the substrate-mounted photoelectric conversion device, the issue of crosstalk that may occur when TO-CAN is used can be prevented in advance.

In addition, an optical module according to an eighth aspect of the present invention is the optical module according to the seventh aspect in which, further, a center portion of the light-emitting element according to the first aspect is disposed in a position shifted towards the second reflective surface side in relation to an optical axis on the first lens face.

In the invention according to the eighth aspect, the monitor light can be acquired with further certainty.

Effect of the Invention

In the present invention, a simpler configuration, improved mechanical strength, and improved freedom of design can be achieved in addition to appropriate actualization of optical transmission accompanying monitoring.

BEST MODE(S) FOR CARRYING OUT THE INVENTION

An embodiment of an optical receptacle and an optical module including the optical receptacle of the present invention will be described with reference to FIG. 1 to FIG. 12.

Figure 1:
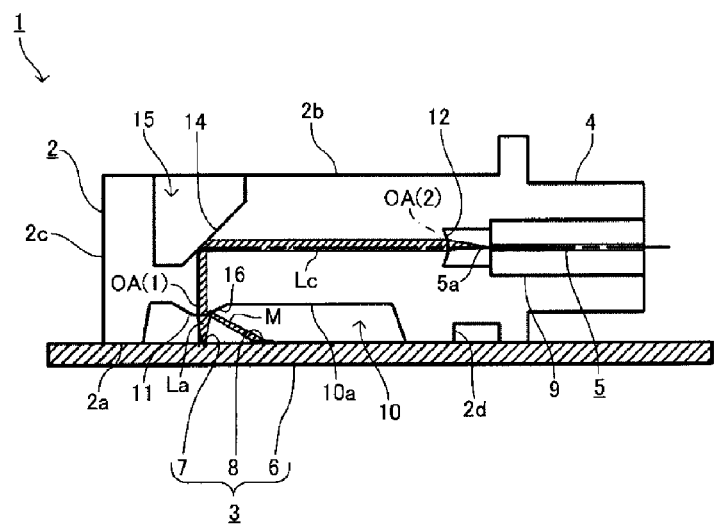
FIG. 1 A schematic configuration diagram of an optical receptacle and an optical module including the optical receptacle according to an embodiment of the present invention FIG. 2 A planar view of the optical receptacle shown in FIG. 1
Figure 2:
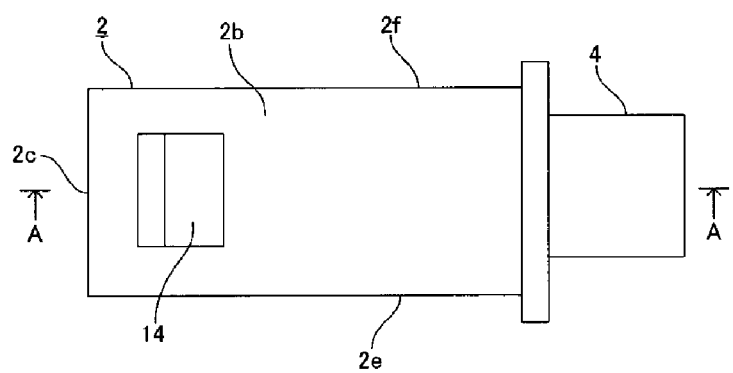
Figure 3:
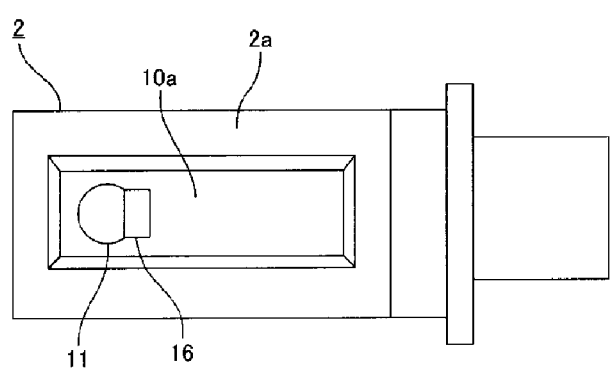
FIG. 3 A bottom view of the optical receptacle shown in FIG. 1

FIG. 1 is a schematic configuration diagram showing an overview of an optical module 1 according to the present embodiment together with a vertical cross-sectional view (corresponding to a cross-sectional view taken along A-A in FIG. 2) of an optical receptacle 2 according to the present embodiment. In addition, FIG. 2 is a planar view of the optical receptacle 2 shown in FIG. 1. Furthermore, FIG. 3 is a bottom view of the optical receptacle 2 shown in FIG. 1.

As shown in FIG. 1, the optical receptacle 2 (optical receptacle main body) according to the present embodiment is disposed between a photoelectric conversion device 3 and an optical fiber 5 that serves as an optical transmission body.

Here, the photoelectric conversion device 3 in FIG. 1 is a substrate-mounted photoelectric conversion device 3. In other words, as shown in FIG. 1, the photoelectric conversion device 3 has a single light-emitting element 7 on a surface (top surface) of a semiconductor substrate (circuit board) 6 on the optical receptacle 2 side, the light-emitting element 7 emitting a laser light La in a direction perpendicular to this surface (upwards). The semiconductor substrate 6 is disposed in parallel with a lower end surface 2a (plane) of the optical receptacle 2 serving as a first surface. The light-emitting element 7 configures the above-described VCSEL. In addition, the photoelectric conversion device 3 has a single light-receiving element 8 on the surface of the semiconductor substrate 6 on the optical receptacle 2 side, in a position to the right of the light-emitting element 7 in FIG. 1, the light-receiving element 8 receiving a monitor light M for monitoring output (such as intensity and amount of light) of the laser light La emitted from the light-emitting element 7. The light-receiving element 8 may be a photodetector. Furthermore, electronic components, such as a control circuit that controls the output of the laser light La emitted from the light-emitting element 7 based on the intensity and the amount of light of the monitor light M received by the light-receiving element 8, are mounted on the surface of the semiconductor substrate 6 on the optical receptacle 2 side (not shown). The electronic components are electrically connected to the light-emitting element 7 and the light-receiving element 8 by wires. The photoelectric conversion device 3 such as this, together with the optical receptacle 2, configures the optical module 1 by, for example, the photoelectric conversion device 3 being attached to the optical receptacle 2 by a known fixing means, such as an adhesive (for example, a thermoset or ultra-violet hardening resin) disposed between the semiconductor substrate 6 and the optical receptacle 2.

In addition, as shown in FIG. 1, a section of the optical fiber 5 on an end face 5a side that has a predetermined length is detachably attached, together with a circular-cylindrical ferrule 9 that holds this section, within a cylindrical optical fiber attaching section 4 that is formed in the optical receptacle 2. In this attached state, the section of the optical fiber 5 on the end face 5a side (the section housed within the optical fiber attaching section 4) is parallel with the semiconductor substrate 6. The optical fiber 5 may be either a single-mode optical fiber or a multi-mode optical fiber.

In a state in which the optical receptacle 2 is disposed between the photoelectric conversion device 3 and the optical fiber 5 such as those described above, the optical receptacle 2 optically couples the light-emitting element 7 and the end face 5a of the optical fiber 5.

The optical receptacle 2 will be described in further detail. As shown in FIG. 1, the outer shape of a main section of the optical receptacle 2 having various optical surfaces is formed into a substantially rectangular parallelepiped shape. In other words, as shown in FIG. 1 to FIG. 3, the main section of the optical receptacle 2 configures an overall outer shape by the lower end surface 2a, an upper end surface 2b that serves as a second surface, a left end surface 2c, a right end surface 2d, a front end surface 2e, and a rear end surface 2f. The upper and lower end surfaces 2a and 2b are parallel with each other. The left and right end surfaces 2c and 2d are also parallel with each other. Furthermore, the upper and lower end surfaces 2a and 2b are perpendicular to the left and right end surfaces 2c and 2d. In addition, the above-described optical fiber attaching section 4 is formed so as to extend towards the right side from the right end surface 2d. However, the present invention is not necessarily limited to a configuration such as this. For example, when the optical receptacle 2 is obtained by injection molding using a transmissive resin material such as polyetherimide, draft angles for releasing the molded article from a mold may be formed on the left and right end surfaces 2c and 2d, and the like.

Figure 4:
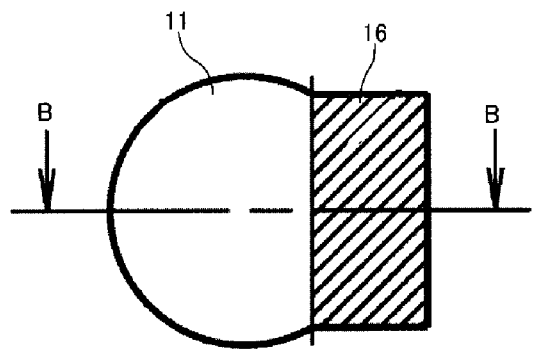
FIG. 4 An enlarged view of a main section of the optical receptacle shown in FIG. 1

As shown in FIG. 1, a first recessing section 10 is formed on the lower end surface 2a of the optical receptacle 2, the first recessing section 10 having a substantially trapezoidal cross-sectional shape that recesses upwards in relation to the lower end surface 2a. An inner bottom surface 10a of the first recessing section 10 is formed parallel with the lower end surface 2a. As shown in FIG. 1 and FIG. 3, a single first lens face 11 is formed on the inner bottom surface 10a of the first recessing section 10 in a position near the left end portion in FIG. 1 and FIG. 3. Here, as shown in FIG. 3 and FIG. 4, in the bottom view, the first lens face 11 is formed having a shape in which a portion of a circular shape (a section within a predetermined area on the right end portion side) is cut off in a linear manner (bow string shape). In addition, as shown in FIG. 1, the first lens face 11 is formed into a spherical or aspherical convex lens face of which the convex surface faces the light-emitting element 7 side. In addition, the axial direction of an optical axis OA(1) on the first lens face 11 may be perpendicular to the lower end surface 2a.

Figure 5:
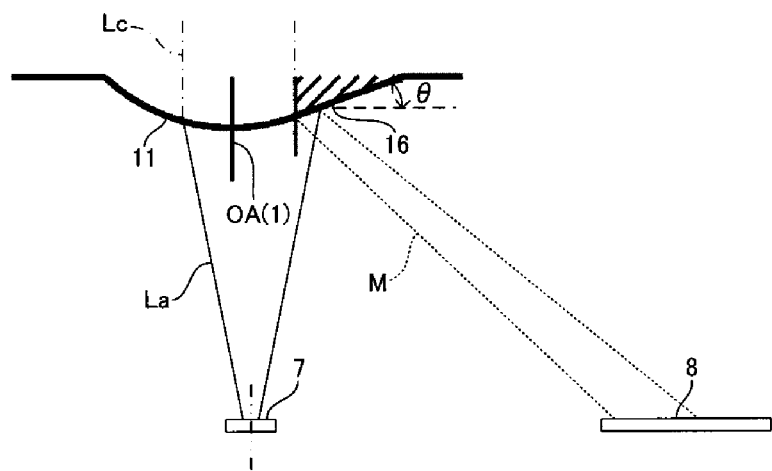
FIG. 5 An enlarged vertical cross-sectional view of the main section of the optical receptacle shown in FIG. 1 in a light-dividing state FIG. 6 A schematic diagram of an example of a spot shape of a fiber coupling light of the optical receptacle shown in FIG. 1

As shown in FIG. 5 (corresponding to a cross-sectional view taken along B-B in FIG. 4), in a state in which the optical receptacle 2 is attached to the photoelectric conversion device 3, a portion of laser light La, of the laser light La emitted from the light-emitting element 7, is incident on the first lens face 11, such as that described above, from below. The first lens face 11 advances the incident portion of laser light La into the interior of the optical receptacle 2 as fiber coupling light Lc to be coupled with the end face 5a of the optical fiber 5.

In addition, as shown in FIG. 1 and FIG. 2, a first reflective surface 14 is formed on the upper end surface 2b of the optical receptacle 2 in a position on the side of the advancing direction of the fiber coupling light Lc in relation to the first lens face 11 (a position directly above in FIG. 1). The first reflective surface 14 has a predetermined first slope angle in relation to the lower end surface 2a so as to slope towards the right side as the first reflective surface 14 becomes higher. As shown in FIG. 1, the first reflective surface 14 is composed of only an inner sloped surface of a second recessing section 15 that has a substantially trapezoidal cross-sectional shape formed recessing downwards on the upper end surface 2b.

As shown in FIG. 1, the fiber coupling light Lc that has passed through the first lens face 11 is internally incident (arrives) on the first reflective surface 14, such as that described above, from below (from within the optical receptacle 2) in FIG. 1 at an angle of incidence that is greater than the critical angle. The first reflective surface 14 then totally reflects the internally incident fiber coupling light Lc towards the right side in FIG. 1.

In terms of simplifying design and dimensional accuracy measurement, the slope angle of the first reflective surface 14 may be 45° in the counter-clockwise direction in FIG. 1 with reference to the lower end surface 2a (0°).

Furthermore, as shown in FIG. 1, a single second lens face 12 that serves as an emission surface is formed in a position on the right end surface 2d of the main section of the optical receptacle 2 facing the end face 5a of the optical fiber 5. The second lens face 12 is formed having a circular outer circumferential shape and is formed into a spherical or aspherical convex lens face of which the convex surface faces the side of the end face 5a of the optical fiber 5. An optical axis OA(2) on the second lens face 12 preferably matches the center axis of the end face 5a of the optical fiber 5.

As shown in FIG. 1, the fiber coupling light Lc that has been totally reflected by the first reflective surface 14 is internally incident on the second lens face 12, such as that described above. The second lens face 12 then emits the internally incident fiber coupling light Lc towards the side of the end face 5a of the optical fiber 5 while converging the fiber coupling light Lc.

As shown in FIG. 1 and FIG. 3 to FIG. 5, a second reflective surface is continuously formed on the inner bottom surface 10 of the first recessing section 10 on the right side of the first lens face 11. The second reflective surface 16 is composed of only the surface shape of the section adjacent to the first lens face 11 in the optical receptacle 2. More specifically, as shown in FIG. 3 and FIG. 4, the second reflective surface 16 is connected to the right end portion of the bow string shape of the first lens face 11 and has a rectangular shape in a bottom view. In addition, as shown in FIG. 5, the second reflective surface 16 is formed into a sloped plane having a predetermined second slope angle θ[°] in relation to the lower end surface 2a. An angle suitable for the irradiation direction of the monitor light M (in other words, the disposition position of the light-receiving element 8), the size of the light receiving surface of the light-receiving element 8, and the like may be set as the second slope angle θ.

The center portion of the light-emitting element 7 indicated by the two-dot chain line in FIG. 5 (in other words, the center of the laser light La) is disposed in a position shifted towards the second reflective surface 16 side in relation to the optical axis OA(1) on the first lens face 11.

As shown in FIG. 1 and FIG. 5, the remaining portion of laser light La, other than the portion of laser light La incident on the first lens face 11, of the laser light La emitted from the light-emitting element 7 is incident on the second reflective surface 16, such as that described above. Then, the second reflective surface 16 uses Fresnel reflection and reflects the incident remaining portion of laser light La towards the light-receiving element 8 as the monitor light M that has a predetermined reflectance satisfying the so-called Fresnel formula.

Figure 6:
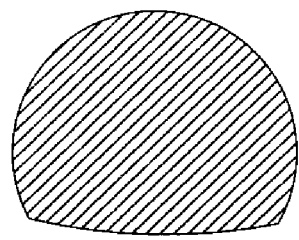
Figure 7:
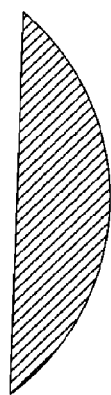
FIG. 7 A schematic diagram of an example of a spot shape of a monitor light of the optical receptacle shown in FIG. 1
Figure 8:
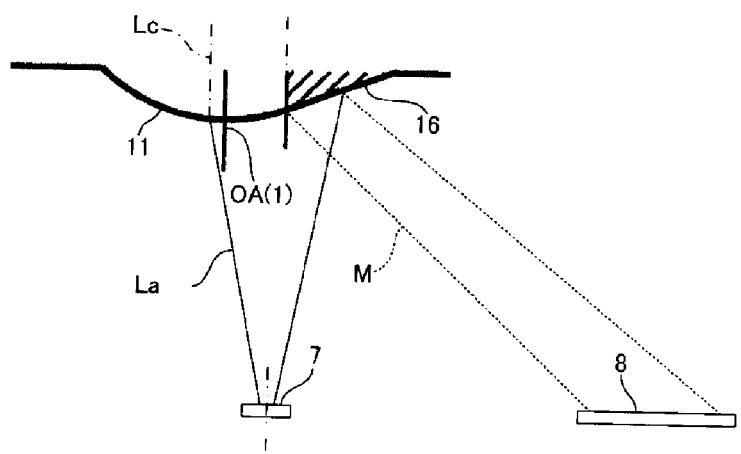
FIG. 8 An enlarged vertical cross-sectional view of a main section in a first variation example of the present invention FIG. 9 An enlarged vertical cross-sectional view of a main section of an optical receptacle in a second variation example of the present invention FIG. 10 An enlarged vertical cross-sectional view of the main section of the optical receptacle shown in FIG. 9 in a light-dividing state FIG. 11 A schematic configuration diagram of an optical module in a third variation example of the present invention FIG. 12 A right-side view of the optical receptacle shown in FIG. 11

Here, FIG. 7 shows a spot shape of the monitor light M, reflected as described above, on the light-receiving element 8. On the other hand, FIG. 6 shows a spot shape of the fiber coupling light Lc on the end face 5a of the optical fiber 5.

In the above-described configuration, the laser light La of the light-emitting element 7 can be divided into the fiber coupling light Lc and the monitor light M by the first lens face 11 and the second reflective surface 16. Therefore, optical communication accompanying monitoring can be actualized by a simple and sturdy configuration. Specifically, a recessing section for light division such as that described in Patent Literature 1 is not required. Therefore, the mold shape can be simplified and mechanical strength can be improved. In addition, the monitor light M is incident on the light-receiving element 8 without a change in direction on the optical path subsequent to the second reflective surface 16. Therefore, an optical path for the monitor light M that is suitable for free positioning of disposition position of the light-receiving element 8 can be easily designed simply by the surface shape of the second reflective surface 16 being selected.

A reflective film composed of a thin film of a metal (such as Al, Ag, or Au) having high light reflectance, or the like may be formed as required on the first reflective surface 14 and the second reflective surface 16. However, when priority is given to reducing the number of components, as described above, a configuration using only total reflection and Fresnel reflection is preferably used.

Various variation examples, such as those described below, may be applied to the present invention.

First Variation Example

For example, the light intensity ratio of the fiber coupling light Lc and the monitor light M can be adjusted based on a light beam cross-sectional area ratio of the portion of laser light La incident on the first lens face 11 and the remaining portion of laser light La incident on the second reflective surface 16 (area ratio of the cross-sections perpendicular to the optical axis OA(1)). The light beam cross-sectional area can be adjusted by the amount of offset of the center portion of the light-emitting element 7 in relation to the optical axis OA(1).

Therefore, when the light intensity of the monitor light M is to be increased from that shown in FIG. 5, the center portion (two-dot chain line portion) of the light-emitting element 7 can be disposed in a position farther away towards the second reflective surface 16 side in relation to the optical axis OA(1) on the first lens face 11.

Second Variation Example

Figure 9:
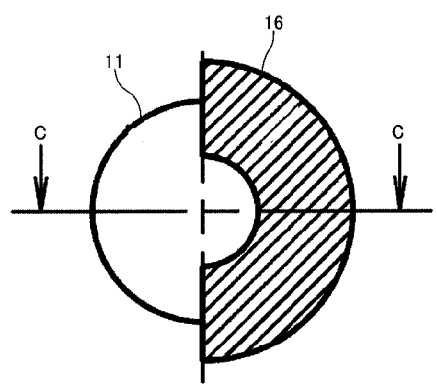
Figure 10:
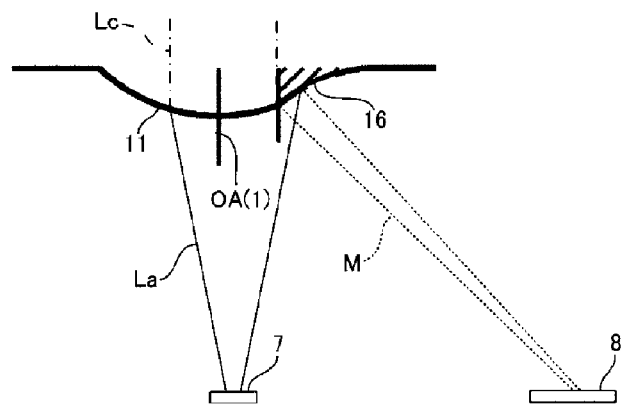

In addition, as shown in FIG. 9 and FIG. 10 (corresponding to a cross-sectional view taken along C-C in FIG. 9), the second reflective surface 16 may be formed into a sloped convex curve surface that faces the light-receiving element 8 side and forms a semi-annular shape in a bottom view.

In a configuration such as this, the second reflective surface 16 can be provided with a light-collecting function for the monitor light M. Therefore, coupling of the monitor light M with the light-receiving element 8 can be efficiently performed.

Third Variation Example

Figure 11:
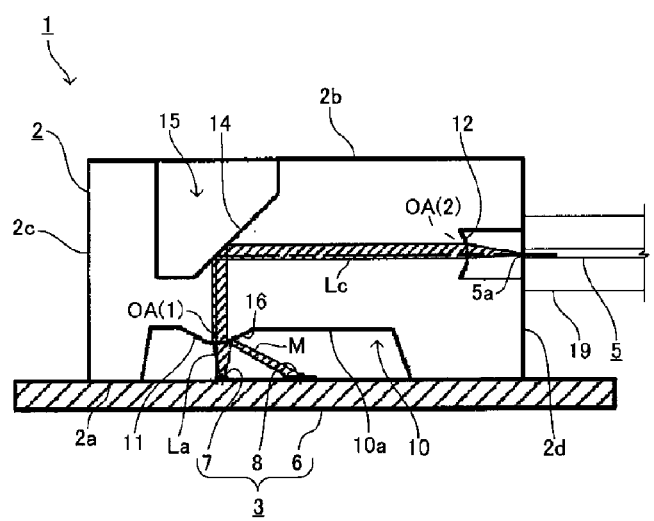
Figure 12:
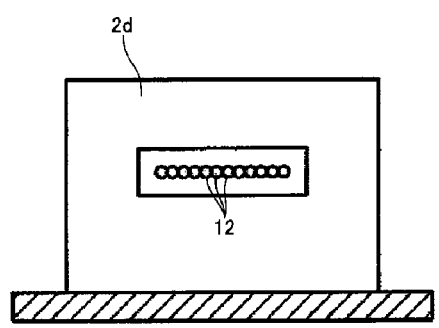

Furthermore, as shown in FIGS. 11 and 12, a configuration that supports multi-channeling of the optical transmission accompanying monitoring is also possible.

In other words, in the present variation example, the photoelectric conversion device 3 is configured so that a plurality (twelve) of light-emitting elements 7 and a plurality (twelve) of light-receiving elements 8 are each formed in an array in a direction perpendicular to the surface of the paper on which FIG. 11 is printed. In addition, in the present variation example, the same number of optical fibers 5 as the number of light-emitting elements 7 and the number of light-receiving elements 8 are disposed in an array along the same direction as the array direction of the light-emitting elements 7 and the light-receiving elements 8. In FIG. 11, the optical fibers 5 are attached to the optical receptacle 2 by a known attachment means in a state in which the optical fibers 5 are housed within a multi-core integrated connector 19.

In addition, in correspondence to the configurations of the photoelectric conversion device 3 and the optical fibers 5, such as that described above, the optical receptacle 2 is formed so that the dimension in the direction perpendicular to the surface of the paper on which FIG. 11 is printed is larger than that of the configuration shown in FIG. 1, so that an optical path between each light-emitting element 7 and each optical fiber 5 and an optical path between each light-emitting element 7 and each light-receiving element 8 can be formed. Furthermore, the same number of lens faces 11, lens faces 12, and second reflective surfaces 16 as the number of light-emitting elements 7, optical fibers 5, and light-receiving elements 8 are formed in positions respectively corresponding to the light-emitting elements 7, the end faces 5a of the optical fibers 5, and the light-receiving elements 8.

In the present variation example, the laser light La of each light-emitting element 7 can be divided into the fiber coupling light Lc and the monitor light M of each light-emitting element 7 by the first lens face 11 and the second reflective surface 16 corresponding to each light-emitting element 7. Therefore, multi-channel optical transmission accompanying monitoring can be actualized by a simple and sturdy configuration. In addition, a flexible design based on the disposition position of the light-receiving elements 8 becomes possible.

The present invention is not limited to the above-described embodiment and may be variously modified to the extent that features thereof are not compromised.

For example, an optical transmission body other than the optical fiber 5, such as an optical waveguide, may be applied to the present invention.

EXPLANATIONS OF LETTERS OR NUMERALS 1 optical module
2 optical receptacle
3 photoelectric conversion device
5 optical fiber
5a end face
6 semiconductor substrate
7 light-emitting element
8 light-receiving element
11 first lens face
14 first reflective surface
16 second reflective surface

The invention claimed is:

1. An optical receptacle for optically coupling a light-emitting element and an optical transmission body when the optical receptacle is disposed between a photoelectric conversion device and the optical transmission body, said photoelectric conversion device including a substrate on which the light-emitting element and a light-receiving element that receives monitor light for monitoring light emitted from the light-emitting element are disposed, said optical receptacle comprising:

a first lens face that is disposed on a first surface on the photoelectric conversion device side in an optical receptacle main body so that a portion of light of the light from the light-emitting element is incident thereon;

a first reflective surface that is disposed on a second surface on the side opposite to the first surface in the optical receptacle main body with a predetermined first slope angle in relation to the first surface so that the portion of light that has been incident on the first lens arrives, and that reflects the arrived portion of light;

an emission surface that emits the portion of light that has been reflected by the first reflective surface towards the optical transmission body; and a second reflective surface that is disposed on the first surface continuously with the first lens face so that a remaining portion of light other than the portion of light, of the light of the light-emitting element, is incident thereon, and that reflects the incident remaining portion of light towards the light-receiving element as the monitor light, wherein the first lens face is convex and has a top part and a downward slope part surrounding the top part through which an optical axis passes, and the second reflective surface replaces a portion of the downward slope part and forms a downward slope continuous from the top part of the first lens face, the second reflective surface is formed by only the surface shape of a section adjacent to the first lens face in the optical receptacle main body, and generates the monitor light only by total reflection or Fresnel reflection of the remaining portion of light, and the center portion of the light-emitting element is disposed in a position shifted towards the second reflective surface side in relation to an optical axis on the first lens face.

2. The optical receptacle according to claim 1, wherein:

the second reflective surface has a rectangular shape having a sloped plane that forms a predetermined second slope angle in relation to the first surface.

3. The optical receptacle according to claim 1, wherein:

the second reflective surface has a partial ring shape surrounding the optical axis of the first lens face, said partial ring shape having a convex curved surface that faces the light-receiving element side.

4. The optical receptacle according to claim 1, wherein:

the emission surface is a second lens face that emits the portion of light while converging the portion of light.

5. The optical receptacle according to claim 1, wherein:

the first reflective surface is a total reflection surface on which the portion of light is internally incident at an angle of incidence that is greater than a critical angle and that totally reflects the internally incident portion of light.

6. An optical module comprising:

the optical receptacle according to claim 1; and the photoelectric conversion device in which the light-emitting element and the light-receiving element that receives monitor light for monitoring light emitted from the light-emitting element are disposed on the substrate.

* * * * *